United States Patent
Erb (10) Patent No.: US 9,621,721 B2
(45) Date of Patent: Apr. 11, 2017

(54) INCOMING CALL REDIRECTION

(75) Inventor: Paul Andrew Erb, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 37 days.

(21) Appl. No.: 12/925,481

(22) Filed: Oct. 22, 2010

(65) Prior Publication Data

US 2012/0099719 A1    Apr. 26, 2012

(51) Int. Cl.
*H04M 3/42* (2006.01)
*H04M 3/436* (2006.01)

(52) U.S. Cl.
CPC .... *H04M 3/436* (2013.01); *H04M 2203/2011* (2013.01); *H04M 2203/2072* (2013.01)

(58) Field of Classification Search
CPC .......... H04M 3/54; H04M 3/58; H04M 3/436; H04M 3/42263; H04M 3/533; H04W 4/16; H04L 65/1096
USPC ........................................ 379/211.02, 212.01
See application file for complete search history.

(56) References Cited

U.S. PATENT DOCUMENTS

| | | | |
|---|---|---|---|
| 5,930,700 A | 7/1999 | Pepper et al. | |
| 6,693,897 B1* | 2/2004 | Huang | H04M 1/6505 370/352 |
| 7,289,616 B2* | 10/2007 | Punaganti Venkata et al. | 379/201.06 |
| 2003/0095542 A1* | 5/2003 | Chang et al. | 370/352 |
| 2004/0001582 A1* | 1/2004 | Siddiqui et al. | 379/211.01 |
| 2004/0229600 A1 | 11/2004 | Saez et al. | |
| 2005/0113134 A1* | 5/2005 | Bushnell | H04M 15/49 455/555 |
| 2008/0112390 A1* | 5/2008 | Kucmerowski | H04L 12/66 370/352 |
| 2010/0056120 A1 | 3/2010 | Olrog et al. | |
| 2010/0310057 A1* | 12/2010 | Theppasandra et al. | 379/88.04 |
| 2011/0299668 A1* | 12/2011 | Davies et al. | 379/88.12 |

FOREIGN PATENT DOCUMENTS

WO    WO 95/12948 A1    5/1995

* cited by examiner

*Primary Examiner* — Rasha Al Aubaidi (57) ABSTRACT

Systems and methods for redirecting incoming phone calls made to a user are disclosed. A system includes a call server configured to receive a phone call. A determination module determines whether to provide the user with an option to route the call to an alternate destination. The alternate destination can include a different user. A destination selection module selects the alternate destination to be provided to the user based on a predetermined criterion. A presentation module presents the alternate destination as an option to the user when the determination to provide the alternate destination option is affirmative. A user input module enables user selection of the alternate destination option. A routing module routes the phone call to the alternate destination when the user selects to redirect the phone call to the alternate destination.

17 Claims, 3 Drawing Sheets

INCOMING CALL REDIRECTION

BACKGROUND

A revolution in communications in the 21st century has enabled people to communicate like never before. Many people in developed countries often have three or more communications means available at any one time. Improvements in technology have made it much more likely that a telephone call will reach the person being called via at least one of the communications means. As a result, the number of calls being presented to an individual may create a significant number of interruptions. Excessive interruptions can reduce the person's effectiveness and/or cause additional stress.

Without the expense of a personal secretary to forward calls or information, a person can miss important calls or contrariwise be swamped with too many unimportant calls as the person moves about in the normal conduct of his or her job. The delays caused by the inability to communicate or handle calls efficiently can be expensive and time consuming.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

Various attempts have been made to enable more efficient routing of telephone calls. For example, simple call forwarding can be used to forward calls from a business phone to a person's cell phone if he or she leaves their desk. If the person is not at the first location, such as work, then additional phone numbers are tried. The previous location of the person may be known based on the last phone call answered. Contextual systems have been developed that route calls so that routing is consistent with the current priorities of a user. Additional systems have been developed which can enable a user to receive a phone call, irrespective of the user's location and communication means.

As a result, the number of calls being presented to an individual may result in a significant number of interruptions. These calls can be answered or sent to voicemail for later handling. However, these calls typically result in a voicemail that is still handled by the originally intended recipient. In any case, the called person handles the call even when there is someone more appropriate available to handle the call. Excessive interruptions can reduce the person's effectiveness and/or cause additional stress.

Some attempts to mitigate the interruptions include use of a secretary to handle incoming calls and direct them appropriately. The secretary may typically handle calls for one or more managers and/or executives. Calls can be evaluated and only appropriate calls may be passed through to the originally intended recipient.

Figure 1:
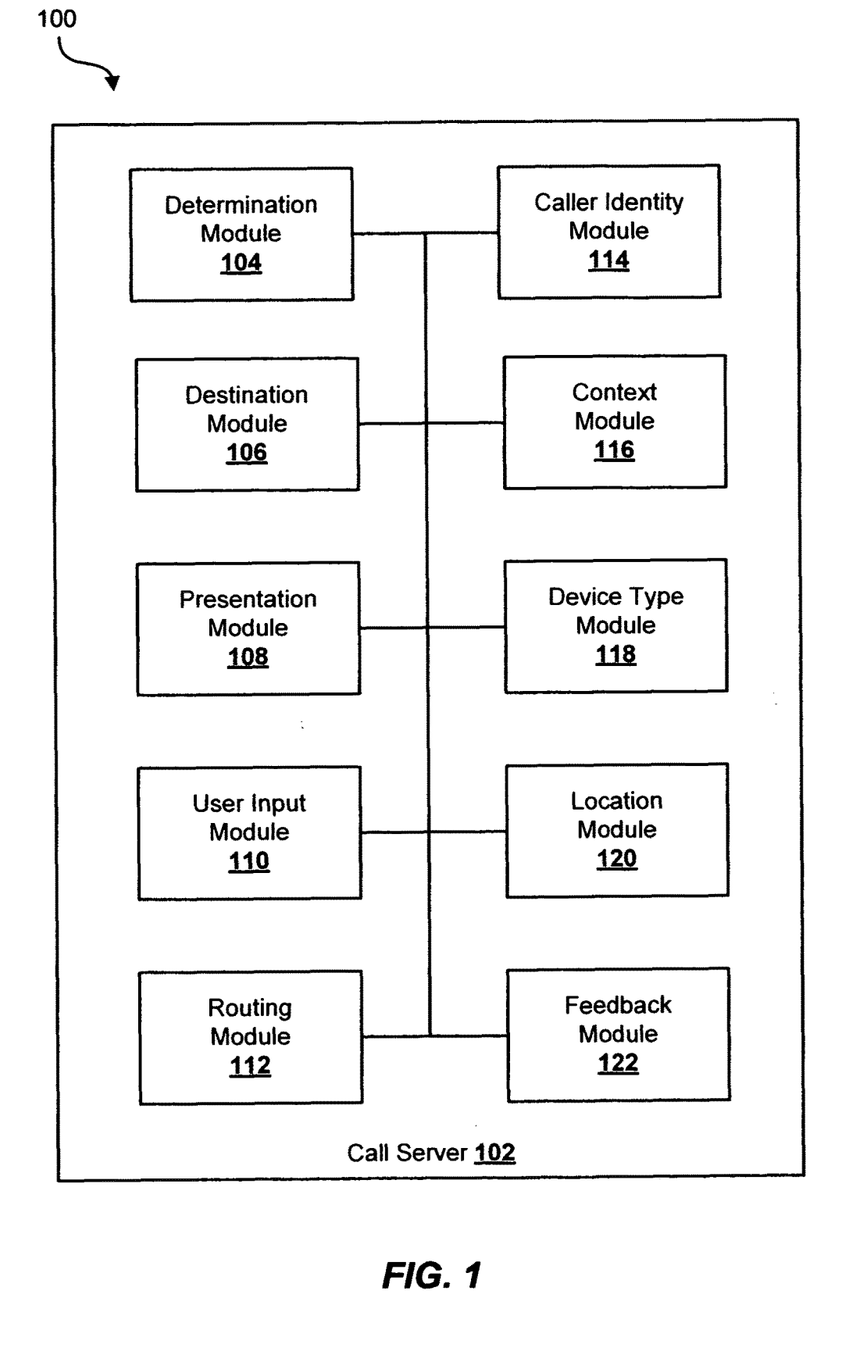
FIG. 1 illustrates a block diagram of an example system for redirecting incoming phone calls made to a user in accordance with an embodiment of the present invention.

Systems and methods for redirecting incoming phone calls made to a user are disclosed which can enable a user to redirect a phone call without answering the call or having the call go to voice mail. FIG. 1 illustrates a system 100 for redirecting incoming phone calls in accordance with an example. Some of the components of the system will be briefly described and then will be discussed in greater detail below. The system includes a call server 102 configured to obtain identity information of a caller for a phone call received at the call server. A determination module 104 determines whether to provide the user with an option to route the call to an alternate destination. The alternate destination can include a different user. A destination selection module 106 selects the alternate destination to be provided to the user based on a predetermined criterion. A presentation module 108 presents the alternate destination as an option to the user when the determination to provide the alternate destination option is affirmative. A user input module 110 enables user selection of the alternate destination option. A routing module 112 routes the phone call to the alternate destination when the user selects to redirect the phone call to the alternate destination.

The system 100 for redirecting phone calls to a user can take advantage of modern communication conveniences. For example, a person in a meeting may not want to be interrupted by a phone call. However, the person may also want the phone call to be handled by another person. For example, if the call is from an important person, such as a boss or client, the person may be unable to leave the meeting to take the call, but may wish to direct the call to someone else who is capable of handling the call immediately.

The system 100 includes a call server 102 that is configured to obtain identity information for a phone call received at the call server. For example, the call server can obtain caller identification information (caller ID), also referred to as call display. The caller ID may be in the single data message format (SDMF) or multi data message format (MDMF). The call server may also receive automatic number identification information, or another type of information to enable telephone number and/or identification of the caller to be discovered. The call server can be a Private Branch Exchange (PBX) server, an internet protocol (IP) call server, or another type of server configured to receive and route telephonic information.

The system 100 includes a determination module 104. The determination module can determine whether to provide the user with an option to route the call to an alternate destination. The alternate destination can include a different user. Thus, the system enables a user to route the call to someone other than the user and to somewhere other than the user's voice mail, all without answering the call. The determination module uses criteria for determining whether to provide the alternate destination option to the user. The criteria can be input by the user or an administrator through a graphical user interface for a configuration module on the call server 102. For example, criteria which may be used in determining whether to provide the alternate destination option includes the identity information for the phone call, a status of the user's phone, a status of the user's schedule, and so forth. Combinations of criteria may also be used. In one example, the determination module determines whether to provide the alternate destination option to the user based on the identity information for the phone call. Thus, the user can enable alternate destination options for certain clients or co-workers, but may disable presentation of alternate destinations when the call is from the user's boss or from an important client. In another example, the determination module can determine whether to provide the alternate destination option to the user based on a time or day. The user may be busier in the afternoons than the mornings and may be busier toward the end of the week than the beginning of the week. Thus, the user can enable presentation of alternate destinations when the user is busier and disable presentation of alternate destinations when the user is less busy. This functionality can tie into the context module or calendar module described in further detail below.

The system 100 includes a destination selection module 106. The destination selection module can select the alternate destination to be provided to the user based on a predetermined criterion. The destination selection module can be in communication with a database for storing alternate destination information, caller identification information, and so forth. The destination selection module can also work in conjunction with the configuration module described above and the caller identity module 114 described below to select alternate destination options. For example, the user can pre-configure various lists of alternate destinations to use for different callers, for different times of day, and so forth. Thus, the system 100 may present one list of alternate destinations to the user for caller X and a different list of alternate destinations to the user for caller Y.

In another example, the system may present one list of alternate destinations to the user in the morning for caller X and a different list of alternate destinations to the user in the evening for the same caller X because at least some of the alternate destinations may be in the office in the mornings but not the evenings and vice versa. The configuration of the lists of alternate destinations may be based on a likelihood of the subject matter of the call. In one example, the alternate destination lists can be statically or dynamically defined. The alternate destination lists can also be automatically populated based on identity information available through the caller identity module. Some example information includes client identification, project identification, phone number dialed to reach the user, and so forth.

The system 100 includes a presentation module 108. The presentation module can present the alternate destination as an option to the user when the determination to provide the alternate destination option is affirmative. In one example, the presentation module can be a display module for graphically displaying the alternate destination to the user on a display of the user's phone. In another example, the presentation module can be an interactive voice response (IVR) system for audibly providing the alternate destinations to the user and receiving vocal user selection of an alternate destination. The presentation module can work in conjunction with a device type module 118, described below, to format and present the alternate destination(s) to the user based on the type of device the user is using.

The system 100 includes a user input module 110. The user input module can enable user selection of the alternate destination option. For example, the user input module may detect when a button on the phone is pressed, when a region of a touch-screen interface is touched, when a user speaks into a microphone, and so forth. The user input module can convert the user input into an electrical signal to indicate the user input to a routing module.

The system 100 includes a routing module 112. The routing module can route the phone call to the alternate destination when the user selects to redirect the phone call to the alternate destination. In one example, the routing module automatically routes the phone call to a predetermined destination when the user does not act to select an alternate destination option provided. The predetermined destination can be one of the alternate destinations provided to the user or can be a different destination. For example, alternate destination options provided to the user can include a number of supervisors. If the user does not select one of the supervisor alternate destinations to use as a default or predetermined destination, the user can instead select for a secretary to receive and direct the call. In other examples, the predetermined destination can be dynamically determined by the system based on caller identity information, scheduling availability of possible alternate destinations, time of day, status of project, and so forth.

The routing module 112 can also route information related to the phone call along with routing of the phone call. For example, this information related to the phone call may include a notification of the phone call, identity information of the caller, information about the user who redirected the phone call, and so forth. The notification of the phone call can be in the form of a text message, voice message, email, instant message, or any other suitable form of notification.

The system 100 can also be adapted for caller-oriented call redirection. More specifically, the determination module 104 can determine whether to present the alternate destination option to the caller rather than the user. The destination selection module 106 can select and provide the alternate destination as an option to the caller when the determination to provide the alternate destination option to the caller is affirmative. The routing module 112 can then route the phone call based on a caller selection of the alternate destination option. Generally, the determination module will not determine to present alternate destinations to both the caller and the user to avoid confusion, but such a configuration is also contemplated. The various aspects of alternate destination selection, routing, and so forth described herein as applied to the user can also be applied to the caller. Thus, for example, scheduling availability may be a factor in determining which alternate destinations to provide to the caller for selection.

The system 100 further comprises an optional caller identity module 114. The caller identity module is in communication with the call server 102. The call server can communicate the identity information for the phone call to the caller identity module. The caller identity module contains contact information associated with a business's clients, customers, employees, acquaintances, and other desired associates. The contact information can include background information for the caller, including the person's name, employer, title, phone numbers, email address, and so forth. The identity information can be matched with a specific person's contact information. For example, a phone number obtained at the call server from the caller ID can be matched with a contact file and associated with a specific person. Selected background information for the caller can then be used by the determination module 104 or the destination selection module 106 in determining whether to provide an option to the user to route the call to an alternate destination and which alternate destination(s) option(s) to provide to the user.

The system can include an optional context module 116 configured to postulate a context in which the phone call will be received by the user. The context is postulated based on available user context information. For example, the context module can be a calendar module in communication with a calendar server such as a Microsoft Exchange Server®. By accessing the calendar information in the Microsoft Exchange Server, a location of the user (i.e. the person to whom the phone call was made) can be determined. The status of the user may also be determined. If the user indicates that he or she is in a meeting, that information can be taken into account. Additional information can also be used, such as whether the user is out of the office, or not available to communicate. If the person is in a meeting, the location of the meeting may be available in the calendar information. For example, a specific conference room may be listed or reserved. The context information can be used to determine how to route the phone call from the caller to the user.

The context information from the context module 116 can be used in conjunction with the background information from the caller identity module 114. For example, if the caller is determined to be the user's boss, or an important client of the user, then this information can be used to route the call to the user without alternate destination options even if the context module lists the user as busy or in a meeting. The context module can also use context information of other people (e.g., potential alternate destinations) and can work with the destination selection module 106 for selecting alternate destinations to present to the user. Thus, the context module can check a different user's schedule to determine whether the different user would be available to take the call if the original user were to attempt to redirect the call to the different user. If the different user appears to be unavailable, the context module can indicate to the destination selection module to not present the different user as an alternate destination option.

The system 100 further includes an optional device type module 118. The device type module is configured to store the device type and contact protocol for each of a user's communication resources on which the user may have the phone call routed to receive the call. This information may be input by the user through a graphical user interface. For example, the user may enter his business phone number, cell phone number, and home phone number. The business and home phones can be listed as stationary phones, while the cell phone can be listed as a mobile phone. This information can be used in conjunction with the context information. For example, the context module may determine that the user is out of the workplace on a meeting based on information obtained from the user's calendar. Therefore, using the device type module, a mobile device can be selected to route the phone call to.

The device type module 118 can also determine a format for the presentation module 108 to present alternate destination options to the user for redirecting the phone call based on the type of device to which the call is sent. For example, when the call is sent to a user's business phone which has a touch-screen graphical interface and display, the device type module can indicate to the presentation module to provide a graphical display of alternate destination options to the user. When the call is sent to a user's cell phone which has a graphical display having different dimensions than the touch-screen display of the business phone, the device type module can indicate to the presentation module to format the display of alternate destinations differently to accommodate the cell phone display. When the call is sent to a user's home phone which does not have a display, the device type module can indicate to the presentation module to use an interactive voice response (IVR) system for audibly providing the alternate destinations to the user and receiving user selection of an alternate destination.

Additional device types that can be listed in the device type module 118 include an assistant's phone number, a coworker phone number, an external hot desk connection, a voice mail box, an email account, one or more instant messaging accounts, and one or more social networking accounts. The graphical user interface may be configured to automatically identify the contact protocol needed to route the phone call, or information associated with the phone call. For example, whether the phone is connected to a voice over internet protocol (VOIP) router, the public switched telephone network (PSTN), or can be communicated with via hypertext transfer protocol (HTTP), such as the email account, instant messaging accounts, social networking accounts, and the like. Additional information regarding the use of information from the device type module and the context module will be discussed below.

An optional location module 120 can also be included in the system 100. The location module is configured to determine an estimated location of the user based on previous use of the user's plurality of communication resources. For example, the call server 102 can be in communication with various communication resources of the user. The call server can be in communication with the user's work phone as well as other phones in the place of business. The user may be logged in to another phone through an external hot desk connection. The call server may also be connected to the user's cell phone, especially if it is provided by the user's company.

In certain instances, the user's home phone may even be accessible from the call server 102. The location of the user, or the most likely communication resource with which the user may respond with, can be tracked by the location module 120. For instance, if the user last used his or her cell phone, it is likely that the user is away from his or her desk and most likely to answer the cell phone again. If the user last used a selected hot desk phone at a different location within the company, the hot desk connection may be the most likely place to attempt to connect with the user again. This information can be used in conjunction with the information available from the other modules discussed above to route the phone call to the desired location.

The location module can then be used in conjunction with the destination module to determine which alternate destination option(s) to provide to the user based on the location of the user. For example, if the user is at work, the destination options provided to the user may include team members or co-workers who are less familiar with the likely subject of the phone call. These team members can then approach the user or another knowledgeable person at work if they have questions. This can enable phone calls to be diverted from the user and other knowledgeable people who may be too busy to otherwise take the call, but who are available to help if necessary. If the user is at home or on vacation, the destination options provided to the user may include only people who are knowledgeable about the likely subject of the phone call. Because the user is not available to the less-knowledgeable team members to answer questions or assist with the phone call, the user can in this way ensure that someone else who is fully capable of handling the phone call is the recipient of the call.

The system 100 can include an optional feedback module 122 for providing feedback to the caller regarding a status of the phone call. The feedback can be provided, for example, while the alternate destinations are displayed to the user and while the routing module routes the phone call to the alternate destination. Because the phone call may be routed to various communication devices of the user to find the user, only to have the user forward the call to a different user, a caller may get frustrated or tired of waiting for a response to the phone call. Providing feedback regarding the status of the call can let the caller know at which phone the system is trying to reach the user, or to whom the caller is being redirected.

While a plurality of modules are shown in FIG. 1, it should not be assumed that each of the modules are required for the operation of a system for routing selected phone calls to a user having a plurality of communication resources. The actual number of modules used in routing a selected phone call is dependent on the design criteria of the system and the needs of the user. Also, though a number of modules or system components were described without specific reference to other existing telephony features, components, modules, and the like, it should be understood that the modules can be used with and configured to interact with said existing features, components, etc. For example, the various modules can interact with existing call server features such as hunt groups, personal ring groups, call forward follow me functionality, incoming call redirection chaining, end chaining, and the like.

Additionally, though various modules were described as part of the system, at least some of the modules can be provided by proxy or omitted. Also, whether the module is present, provided by proxy, or omitted, various limitations on functionality of the modules may be implemented. For example, the caller identity module 114 may not be present in the system and the system can apply the same behavior to all callers. In other words, the system in this example can give a same list of alternate destinations to a user, or handle an incoming call in a same way, regardless of the identity of the caller.

Figure 2:
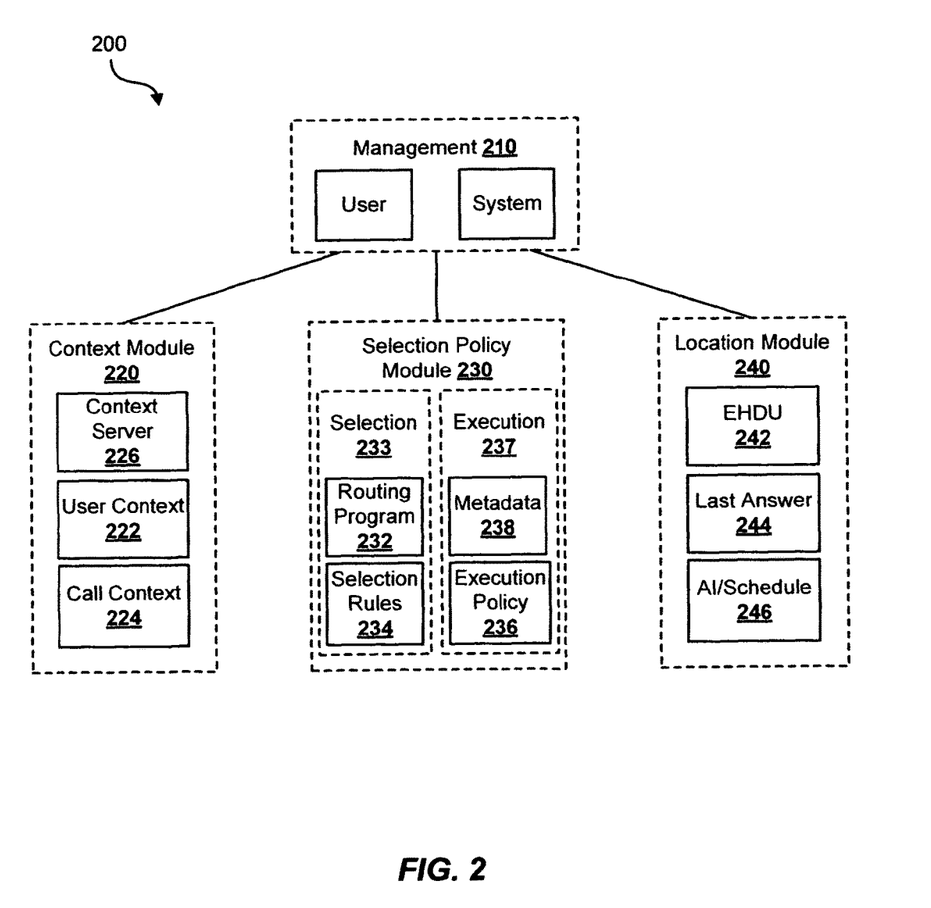
FIG. 2 illustrates a block diagram of an example system for redirecting selected phone calls made to a user in accordance with an alternative embodiment of the present invention.

FIG. 2 shows a system 200 for redirecting selected phone calls made to a user. The system 200 is shown as an alternative layout of the system 100 of FIG. 1. While the layout of the system 200 is illustrated in a different manner than the system 100 of FIG. 1, the differences are provided for purposes of discussion. The two systems are intended to have similar functionality and use.

The exemplary system 200 is illustrated in four main blocks, referred to herein as modules. A management module 210 enables a user or system supervisor to set up and control the system. A context module 220 provides context awareness of both the caller and the user. A location module 240 is used to determine a location of the user at the time a call is received and can also determine a location of different users at the time the call is received. A selection policy module 230 provides selection policies based on metadata, policy data, and input from the management 210, context 220, and location 240 modules. A more detailed description of the elements of the system 200 will follow.

The context module 220 includes a user context module 222 and a call context module 224. As previously discussed, the user context module can be connected to a computer server. In this example embodiment, the server is referred to as a context server 226. The context server is a server, or group of servers that enable contextual information for the user to be obtained in near real time. For example, contextual information for the user can be obtained in near real time from a calendar server. The calendar server may operate on the context server. In one embodiment, the context server can operate multiple separate server applications through the use of virtualization.

The call context module 224 functions similarly to the caller identity module in FIG. 1. The call context module can be in communication with a call server. The call server may be located on the context server 226 or may operate as a separate server. The call server can communicate the identity information for the phone call to the caller identity module. The call context module contains contact information associated with a business's clients, customers, employees, acquaintances, and other desired associates. The contact information can include background information for the caller, including the person's name, employer, title, phone numbers, email address, and so forth. The identity information can be matched with a specific person's context information. For example, a phone number obtained at the call server from the caller ID can be matched with a contact file and associated with a specific person. Selected background information for the caller can then be used to route his or her phone call as needed. This will be discussed more fully below.

Using the information obtained by the user context module 222 from the user's calendar and schedule, the location and likely co-presence of the user and potential alternate destinations (e.g., different users) may be determined. For an incoming call, the user context module can provide the information necessary to determine the ability or desire of a user to answer a phone call based on the user's context and/or preconfigured settings. The information obtained by the call context module can be used to determine who a call is from. This information can then be linked to an expanded information set. For example, caller ID information sent from the call server to the user context module can identify the phone number of the call as (613) 592-2122. The user context module can determine that this is a call from Ann Rowe's directory number and that Ann Rowe is the user's boss. This information can be made available to the selection policy module 230. The assemblage of policy assertions can describe the call and allow policy selection within the caller selection module to determine whether to provide alternate destination options and which alternate destination options to provide to the user.

The location module 240 is used to determine the current location of the user and other users which are candidates to be presented to the user as alternate destination options. Various techniques may be used. For example, the location of the user's external hot desk (EHDU) assignment can be obtained from the EHDU module 242. The location where the user last answered or originated a call may be obtained from the last answer module 244. In addition, the user's schedule can provide an estimate of the user's current location from the schedule module 246. This information may also be obtained from the user context module 222 in the context module 220. The outputs from these modules can be specified in routing programs by the use of reserved values for location. The values 'ehdu', 'last' and 'schedule' can be used to designate the source from which location data can be obtained. Moreover, the location module can be used to combine all estimates into one that is most likely and supply the estimate as well. The value 'likely' can be used to describe a combined estimate of the user's location.

The selection policy module 230 is divided into two sections, a selection group 233 and an execution group 237. The selection group is comprised of the routing program 232 and the selection rules module 234. The execution group is comprised of the metadata module 238 and the execution policy module 236.

The routing program 232 can include one or more static or dynamic sets of alternate destinations to provide to the user. Each of the alternate destinations may be used as appropriate to the goal of providing the user with desirable options for redirecting the phone call, while taking into account the user's current context. The use of different sets of alternate destinations is designed to deal with the postulated context of the user and other contingencies that may be occurring at the time of the phone call.

For example, if a call comes in that is of such importance that it should be dealt with by a user and should not redirected to another person, and the user is not currently interruptible (i.e., the user is engaged in a meeting with an important client), the determination module may decide to not present any alternate destinations. Thus, the user may be left with the options of either answering the call or ignoring the call and letting the call go to voicemail. In an example where the determination module determines to present alternate destinations and an alternate destination is selected, the execution policy module 236 can route the call to the selected alternate destination, such as the user's voicemail, to the user's secretary, or another suitable destination. In one example, a text message, instant message (IM), or email may be sent to the user that identifies the caller and provides information about the caller, along with one or more potential alternate destinations. The user can then determine whether to select an alternate destination. If the user decides to select an alternate destination, the selection can be sent using a same or different format in which the call information was received. Thus, for example, a call text message may list alternate destination options 1-4. The user can text back the number 3 to select alternate destination option number 3. If the user chooses not to take the call and does not select an alternate destination, the phone call may be sent to the user's voice mail or otherwise routed according to preconfigured policies (e.g., route the call to a default alternate destination). The system is able to adapt to current contingencies to direct the phone call with guidance from the user context.

The selection rules module 234 contains rules that can link the call in context to the most appropriate alternate destinations. Individual rules may be selected by the user to identify the alternate destination(s) for various different user contexts. Alternatively, predetermined sets of rules may be selected and applied based on the context of the user. For example, a user may define a rule such as: "for calls from customers while I am in a meeting, present co-workers A, B and C as alternate destinations; for calls from my boss while I am in a meeting, use destination D as a default." The rules may be applied to groups of people, such as customers, or to individual people, such as client X. The rules may be stored in the selection policy module 230. This may be most effective for applying a rule to sets of people. Alternatively, a rule for a particular client may be stored with the background information for the particular client, such as in the call context module 224. If no particular rules are selected for a caller, then the generic rules in the selection policy module may be applied.

The metadata module 238 in the execution module 237 can store information that can be accessed by the routing program 232. For instance, a plurality of communication resources associated with a user can be listed in the metadata module. The determination module can determine whether to present alternate destinations based on a selection of resources, and the selection policy module 230 can select which alternate destinations to present based on the selection of resources. Each resource's address, such as the resource's directory number, URL address, or other type of address can be stored in the metadata module. The metadata module can also include information related to the protocol through which a selected communication resource is operated. The metadata module can also include additional variables, such as whether the resource is fixed or mobile, local to the business or located remotely, whether the expected operator of the device is human, robot, the user, an assistant, and so forth. Additional aspects of the metadata module will be explained below.

The ability to store information related to the user's communication resources in the metadata module 238 enables static or dynamic lists of alternate destinations to be formed that are independent of the user's particular communication resources. This enables lists of alternate destinations to be created that can be used by a variety of people. The ability to create generic or dynamic lists of alternate destination lists enhances the usefulness of the system. While people generally like to be more productive, they are often hesitant to spend the time necessary to create the individual rules needed to create a proper set of alternate destination lists. By using the separate metadata, generic and dynamic lists can be used by people, and then modified to fit their specific needs.

Metadata Table

Data in the metadata module 238 can be stored in a database, table or similar structure. Each desired user of a phone system can be provided with a separate table. Information relating to the user's communication resources can be listed in the user's table. In one embodiment, the metadata can be stored in an XML document with the metadata for each resource being contained within an XML element. Each of these elements may have a number of attributes that can take two or more values. The properties described in the metadata can indicate the user's resource capabilities in a Session Initiation Protocol (SIP). Various attributes of the metadata that can be included in the table are listed below. The list is not intended to be a complete list of all possible metadata attributes, but merely an exemplary list of selected attributes of the user's communication resources.

Address—this is the network address of a communication resource. The address can be a directory number, such as a phone number. Alternatively, the address may be a Uniform Resource Locator (URL) address, a SIP address, an Instant Messaging address, an email address, a link to the user's social networking sites, and so forth.

Protocol—the protocol attribute can describe the protocol used to communicate with the listed communication resource. For example, the protocol may be based on the Public Switched Telephone Network (PSTN), SIP, SIP for Instant Messaging and Presence Leveraging Extensions (SIMPLE), Extensible Messaging and Presence Protocol (EMPP), Simple Mail Transfer Protocol (SMTP), and so forth.

Mobility—the mobility attribute can have two values including: local and remote. The values indicate whether or not the device is suited for local service or can be used external to a building or location.

Class—the class attribute can have values including business and personal. A user may not want to route certain work related calls to a personal communication resource. Alternatively, if it is an important call, from a top client or a boss, then the call may be routed to the user's personal communication resource, such as a home phone or personal cell phone.

Actor—the actor attribute can include various values to identify the relationship of the caller with the user: principal, attendant, message taker, colleague, boss, information, and text. Principal indicates a device associated with a human user. Attendant is a device or human that can assist in contacting the human user. For instance, the attendant may be the user's secretary, who can assist the user in regaining contact with the user. Message taker is a person or device which can accept messages on behalf of the human user. The user voice mail box is an example of this. Information refers to a device that can provide information about the human user. In one example, the information device may supply information about when the user or potential alternate destinations may be available based on the context obtained from the user's calendar, and other resources. Text refers to a text device that can receive text. For instance, information from the call context module 224 in the context module 220 may be sent one or more of the user's communication resources that are configured to receive text, such as a text message on the user's cell phone, or via the user's email, instant messaging, or social networking sites.

Shared—the shared attribute can include two values: yes, and no. Some of the user's communication resources are shared by other humans and devices. An example of this is a residence telephone that can be shared by humans and devices such as fax machines. The routing program 232 and execution policies 236 can include an element called "one-busy-all-busy". In an attempt to present the call with optional alternate destinations the user, if one of his or her communication resources is in use, then it is an indication that the user is on a call and is not reachable. The determination module can determine that alternate destinations should not be provided to the user and the call can be routed either to the user's voicemail or according to the selection rules. However, for shared resources, this may not be the case. A person other than the user may be using the resource. So the shared attribute can be used to differentiate between personal communication resources and shared resources to enable the one-busy-all-busy capability.

Location—multiple of the user's communication resources may be present in the same location. For example, a user's cell phone and desk phone will be in the same location when the user is at his or her desk. In addition, some resources may receive multiple types of communication, such as a mobile phone that can receive calls from a cellular station and via a local wireless connection such as an IEEE 802.11 connection. The same device may also receive texts, email and instant messaging. Forwarding the phone call to each of these resources simultaneously and presenting alternate destinations on each would be superfluous and annoying to the user. Therefore, it is important to determine the location of each of the user's communication resources to reduce the probability that the phone call and alternate destinations are simultaneously directed to multiple resources simultaneously.

The location attribute is used to provide an indication of the resource's location. For portable resources, a location of "user" may be assigned. It can be assumed that a portable resource, such as a cell phone, will be carried by the user. In instances where the use location can be determined, only devices at the user location need to be activated. Alternate destinations can be selected by the selection rules module 234 to identify appropriate alternative resources for the user to route the call to and an appropriate communication format for presenting the alternate destinations to the user. For instance, if the user is in a meeting, a text message may be sent identifying the caller and potential alternate destinations if the caller is deemed sufficiently important to interrupt the meeting. Alternatively, if the meeting is in-house, the call and alternate destinations may be directed to a wired phone with a graphical display that is located in the conference room rather than to the user's cell phone. A wide number of choices may be selected by the user or a programmer in creating the selection rules used to select alternate destinations and the presentation of the alternate destinations. These choices can be updated by the user based on the user's desires and experiences.

Location Suppress—the location attribute is used to ensure that multiple resources in the same location are not all activated concurrently. However, certain users may want specific communication resources to be activated regardless of their location. For example, a user may want the alternate destinations to be presented on his desk telephone regardless of how many of the user's communication resources are present in the room. If the "location suppress" attribute is set to a value of "yes" then the device will be activated regardless of the number of other communication resources to which the phone call is routed. If the attribute for each device at a selected location is set to "no" or another value aside from "yes" then the phone call and any associated alternate destinations will be routed only to a single device that is present at that location.

Suppress—the user may wish to not be presented with alternate destination options on certain communication resources for any reason. For example, the user may wish to always handle calls to his cell phone, at least during a certain period of time. This may be accomplished by setting the "suppress" attribute for the cell phone to "yes". If the attribute is set to "yes", then any alternate destinations will not be presented on the cell phone.

Selection Policy

The selection rules module 234 includes selection policies that examine the contextual information provided by the context module 220. The selection rules module 234 contains rules used to select desirable alternate destinations. The rules may be generic or specific. For example, a generic rule may be that if the user is in his or her office then alternate may be set up to include co-workers A and B, and the receptionist. If the user is in a meeting with a client in his or her office, then alternate destination list 2 should be used. Alternate destination list 2 may list the receptionist first and then co-workers C and D who are not in the meeting. Multiple rules may also be combined. For example, if the caller is identified as a priority caller, such as the user's boss or a top client, then alternate destination list 1 may be used even if the user is in a meeting.

Where rules have conflicts, a conflict mechanism can be used to select one of the rules for implementation. For example, if a call is received from a priority caller, but the user has activated the "suppress" attribute for his desk phone because he is in an important meeting in his office, then the conflict mechanism can be used. The conflict mechanism may rely on a value. For example, the suppress attribute may have a priority level indicator that can be selected by the user. For example, anything below a priority level 8 can be suppressed. A few of the user's contacts are listed as having a priority of 8 or higher. Calls from those contacts will be presented with an otherwise suppressed list of alternate destinations. If multiple rules have the same priority or specificity, then the previous rule selection may be used. If this does not select a single rule, then a random rule selection may be made.

The examples are not intended to provide a complete set of rules. Rules can be selected and established based on the needs of the user. Users with unique needs can set up unique rules to select desired ringing programs based on those needs.

Routing Program

One or more routing programs 232 can be supplied to deal with the types of calls that a user typically receives. The routing program can describe a sequence of actions for determining and presenting alternate destination options to a user or to a series of users who may sequentially select to route the call to another alternate destination. The routing program may be configured in any type of format. For example, the routing program may be formed as a declarative XML format. Other popular formats include Java, HTML, and C. Examples of elements and sub-elements of a routing program will be described below.

In one embodiment, each routing program can be delimited by a program element. This element can have a name attribute that is used to identify individual routing programs for selection. Each individual fork or hop within a routing program can be delimited by a fork element. A fork element is a program that is run to route the phone call to one of the user's alternate destination options or to a default destination. A timeout attribute can be set to provide a maximum amount of time that the ringing program will remain in the fork element. For example, a fork element that includes routing the phone call to the user's desk phone may last for 5 seconds. If the phone call isn't answered within the five second period and an alternate destination is not selected with the same period then the program will move on to the next fork.

The timeout attributes used at each fork element enable a routing program containing multiple forks to be limited to a reasonable period of time. For example, a typical caller may be willing to remain on a phone call for up to 30 seconds while being connected to the user. Each fork in the routing program can route the phone call, or information related to the phone call, for an average time period of 7 seconds. If a first user fails to answer or select an alternate destination for the call within 7 seconds, the call will be routed to the next fork or alternate destination. A limit on the number of forks can be set according to the estimated time the caller will remain on the line. In another example, the number of forks can be set at a predetermined number, and the call can either be terminated after reaching a final fork or may be directed to a voicemail of the final destination.

In another embodiment, routing of the phone call may be suppressed to all resources but the resource determined to be in use by the user. In such a case, the user can be presented with a call waiting indication on the device in use. The user can then choose to take the incoming call, to ignore the call, to route the call to a presented alternate destination, etc.

A location element describes the user's communication resources to which the phone call can be directed in a selected fork. The communication resources may either be described explicitly or indirectly through the metadata module 238. Various attributes can be used with the location element. Example attributes that can be used are described below.

An address attribute can be sent to the location element to provide a communication address of a communication resource. The address may be a URL address, a directory number, an email address, and so forth. A value of "self" can be applied to indicate that the resource is the users and that it is described in metadata. Similarly, a value for "boss", "co-worker", "secretary", and so forth can indicate resources of potential alternate destinations, and can be described in metadata.

The location module 240 is used to identify the current location of the user. Values can be selected as "ehdu", referring to the current hot desk location of the user, "last", referring to the location from which the user and potential alternate destinations last answered or originated a phone call, "schedule", referring to the location at which the user's and potential alternate destinations' calendar or scheduling software places them, and "likely", referring to an estimate that combines the estimates of the above techniques into the most likely location the user and potential alternate destinations may be.

A protocol attribute can be sent to the location element that comprises a metadata descriptor that indicates the protocol or type of application that the communication resource supports, as previously discussed.

An end attribute can be sent to the location element. The end attribute indicates how a connection should be handled. Its primary use will be the provision of announcements to synchronous communication resources. The end attribute can have two values—immediate and controlled. The "immediate" value indicates that the media connection should be dropped immediately after an announcement is made. The "controlled" value indicates that the connection should be maintained until the user indicates that it should be dropped. If the attribute is not specified then the default value of controlled is assumed.

An announce attribute can be sent to the location element. The announce attribute describes an announcement that can be provided over the communication resource immediately after the connection to the resource is set up. The announcement can be used to provide an indication of aspects (importance, caller identity, etc.). The announcement can be used to provide information to the user about the phone call and its progress. The announcement can further be used to provide one or more alternate destination candidates to the user. The announcement can also be used to log contextual information about received calls. A "mail merge" type capability can be provided so that information can be extracted from the generated contextual information about a phone call and presented to the user. The announcement can be described in text. The technique by which the announcement is sent to the communication resource is dependent on the media and capabilities of the endpoint. For a PSTN connection, a text to speech converter may be provided to allow the announcement to be sent as speech. For a telephone that includes a display, the announcement may be presented in text on the display. For example, the announcement may be sent in the form of a text message. The announcement may also be sent as an email, instant message, through social networking, and so forth.

An on-entrance sub-element can provide an indication of actions that can be taken before the main actions of a fork are taken. The on-entrance sub-element can provide an announcement to a human or a log of the implications of the entrance to a fork. For example, the announcement can indicate the relevance of a call to a user so as to inform the user's decision as to whether to accept the phone call or not and/or to whom to redirect the call based on presented alternate destinations.

An on-exit sub-element can provide an indication of actions that may occur upon the expiration of a fork. The on-exit sub-element can provide an announcement to a human or a log indicating the implications that a fork has expired. For example, the announcement may indicate that an important call has been missed. The announcement may further indicate to which of the user's alternate destinations the call was forwarded.

EXAMPLE

An example implementation of a routing program used in routing selected phone calls to a user is provided below. The routing program comprises three cascaded forks. The first fork includes an announcement on entrance that indicates that this is an important call. This announcement is sent to the user's instant messaging client. If the user does not answer the call, the on-exit element causes a log to be created recording that the call wasn't answered. The fork will send the call to a default destination if the user does not select an alternate or answer the call. The fork will send the call to a selected destination if the user does select an alternate destination.

The second fork will trigger if a second user does not answer. For example, the phone call will be routed to the user's colleague (Ann Rowe), one of the user's alternate destinations. The call will be announced with an explanation.

The third fork will trigger if the colleague cannot take the call. The call will be routed according to an alternate destination selection, default destination, or according to other criteria.

Execution Policy

The execution policy module 236 is configured to execute the routing program selected by the selection rules module 234. Various embodiments of the execution policy module 236 (FIG. 2) have been previously described. One of these is the "One_Busy_All_Busy" functionality in which the routing of the phone call is suppressed on all of the user's communication resources if a busy indication is detected on one of the user's unshared resources. The execution policy module will perform this function.

The execution policy module is also responsible for making sure that execution follows the indications of the Location_Suppress and Suppress metadata attributes that have been described above.

Management

The management module 210 can include a management interface. This will allow both users and system management functions to create, delete, and modify routing programs and selection policies. A logging system can also be used to record data about program usage. This may be in the form of simple network management protocol (SNMP) data.

While a plurality of modules are shown in FIG. 2, it should not be assumed that each of the modules are required for the operation of a system for routing selected phone calls to a user having a plurality of communication resources. The actual number of modules used in routing a selected phone call is dependent on the design criteria of the system and the needs of the user.

Figure 3:
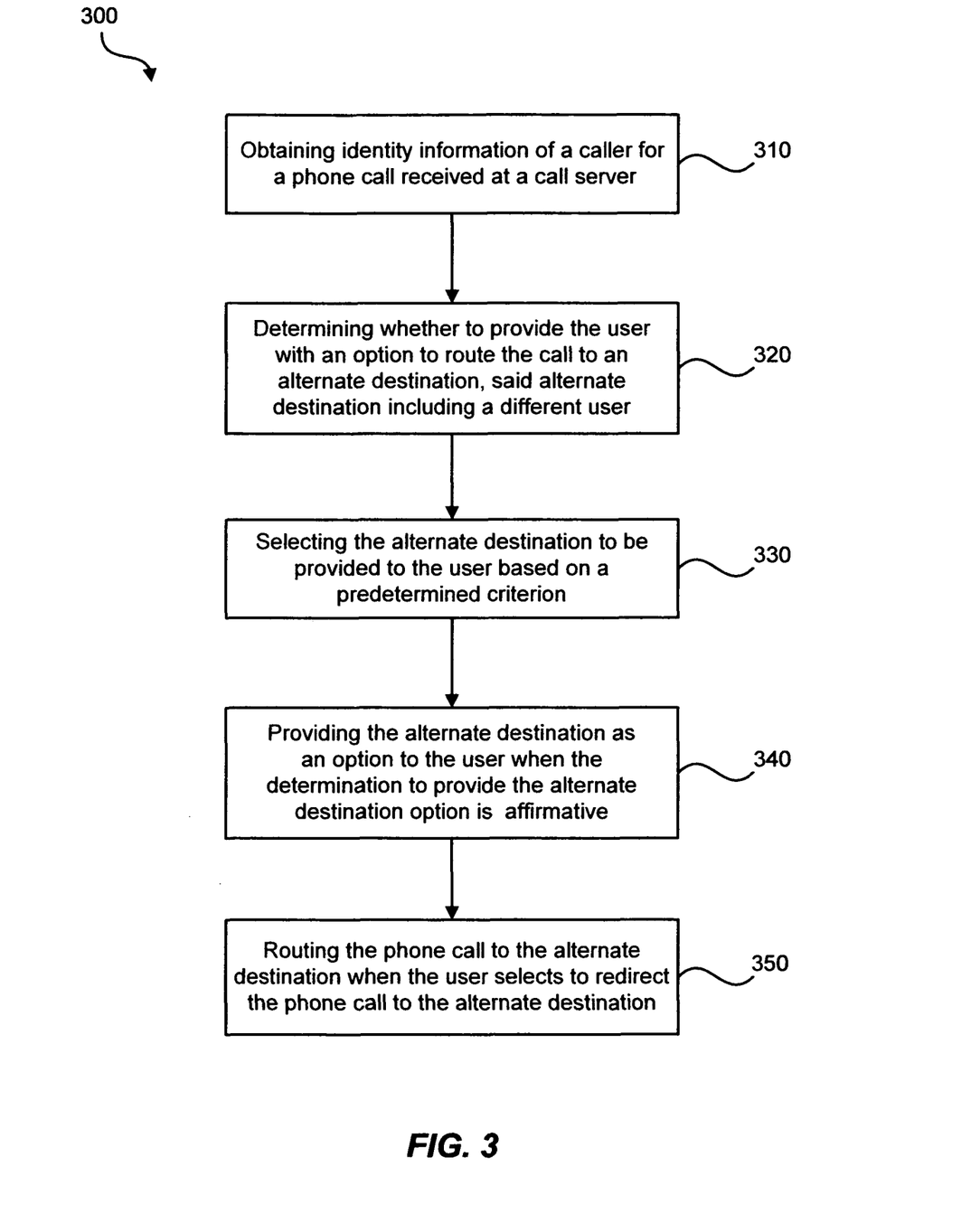
FIG. 3 depicts a flow chart of a method for redirecting incoming phone calls made to a user in accordance with an embodiment of the present invention.

Referring now to FIG. 3, a flow diagram of a method 300 is shown for redirecting incoming phone calls made to a user. When an incoming call is being presented at a call server the system can obtain 310 identity information for the caller.

When an incoming call is being presented, the system determines 320 if it is appropriate to provide a choice of candidate destinations in addition to the normal answer/ignore/forward to voicemail options. If a choice is not appropriate (e.g., the call is an E-911 call return or the caller identity is configured in a list of priority callers), the call is presented as normal, without candidate destinations. The candidate destinations can include another person or user. The candidate destinations can further include forward to voicemail, external destinations (e.g. a toll free contact center number), a recorded announcement device (RAD), and so forth. Determination of whether the call is appropriate for alternative destinations may also utilize static and/or dynamic information, such as calendaring information, location information, and other information as described above.

The method 300 can include selecting 330 the candidate or alternate destination to be provided to the user based on a predetermined criterion. Example criteria for selecting alternate destinations can include identity of the caller, scheduling of the user or the potential alternate destinations, location information or the user or the potential alternate destinations, and so forth. Methods such as programmable key module (PKM) or PC based user interface (similar to UCA) may be used selection of candidate destinations to present to the user. Candidate destinations and associated criteria may be configured by a system administrator and/or phone user. Candidate destinations and associated criteria may also be configured automatically and/or by proxy. In one aspect, selecting the candidate destination may include selecting a preconfigured list of candidate destinations. Selecting the preconfigured list may further comprise narrowing the preconfigured list based on predetermined criteria, such as the criteria described above for selecting alternate destinations.

The steps of determining whether to provide an alternate destination option to the user and selecting the alternate destination to be provided to the user can be based on presence data of the user. The presence data of the user can be determined as a result of user interaction with electronic devices in communication with the call server. For example, if the call server has a record that the user last used the user's home phone, the determination of whether to provide alternate destinations and/or the selection of the alternate destinations can be different than if the call server has a record that the user last used the user's office phone.

The method 300 can further include providing 340 the alternate destination as an option to the user when the determination to provide the alternate destination option is affirmative. Providing the alternate destination to the user may comprise displaying the alternate destination, among other alternate destinations, to a user on a phone display. Providing the alternate destination to the user may also comprise audibly presenting the alternate destinations to the user and enabling the user to select an alternate destination using a user input device, such as by pressing a key, touching a screen, or voicing a selection.

The phone call can be routed 350 to the alternate destination when the user selects to redirect the phone call to the alternate destination. The phone call can be routed to a predetermined destination (which may be an alternate destination presented to the user or a different destination) when the user does not act to select the alternate destination option.

The method 300 can be iterative at subsequent hops or forks. Thus, for example, the method can further include determining whether to provide a different alternate destination option to the next user; selecting the different alternate destination to be provided to the next user based on a predetermined criterion; displaying the different alternate destination as an option to the next user when the determination to provide the different alternate destination option is affirmative; and routing the phone call to the different alternate destination when the next user selects to redirect the phone call to the different alternate destination. The method can be repeated again at the different alternate destination.

The method 300 can also restricting a number of hops the phone call can make to limit the possibility of the caller being stuck in an endless loop or to limit the amount of time the caller waits before being connected to a person, transferred to voicemail, or dropped. In this example, the determination of whether to provide the alternate destination option to the user can be based on a number of hops the phone call has made before being routed to the user.

The method can include displaying traditional answer, ignore, and forward options to the user in addition to one or more alternate destination options. If the user selects ignore, the call can be dropped or sent straight to voicemail. In another example, selection of the ignore option can be treated the same as if the user did not select any options and the call can be redirected to a default alternate destination. If the user answers the call, the call will not be redirected to an alternate destination. If the user wishes to forward the call using the traditional option, the user can answer the call and then forward the call according to traditional call-forwarding options. The method can include enabling the user to dynamically select a different alternate destination not displayed by selecting the different alternate destination from a list or by inputting the different alternate destination without answering the call.

EXAMPLE

An example implementation of the method on a system is as follows. Steve, a Product Support specialist, places a call to a Karen, a Design Manager, to inquire about the response to a specific customer issue. The system determines that the call is appropriate for providing a choice of candidate destinations.

The system configuration for Karen's phones includes the caller identities that are product support specialists with an associated default candidate destination for Robert, the Support Prime. The configuration for Karen's phone also includes Steve's caller identity with associated candidate destinations for Nadia and Andrew, both Designers in Karen's group. Another candidate destination configured for Karen's phone is that of her manager, Norman.

Karen's telephone presents answer, ignore, and forward to voicemail options, as well as the candidate destinations for Robert, Nadia and Andrew, and Norman.

If Karen selects the candidate destination of Robert, the call is transferred to Robert's destination without requiring Karen to answer and talk to Steve first. The call display for Robert would show that the call was forwarded from Karen and, as appropriate, candidate destinations would also be presented as well as the normal options from which Robert can choose.

If Karen ignores the call (or is away from her desk), the call is automatically forwarded to Robert. The associated behavior is the same as Karen selecting the candidate destination of Robert, described above.

An article of manufacture for redirecting a phone call is also provided in accordance with embodiments. The article of manufacture includes a non-transitory computer usable storage medium having computer readable program code embodied therein for redirecting incoming phone calls made to a user. The article of manufacture further comprises computer readable program code capable of performing various operations. One operation is obtaining identity information of a caller for a phone call received at a call server. Another operation is determining whether to provide alternate destinations as options to the user, the alternate destinations comprising a plurality of different users. Another operation is selecting the alternate destinations to be provided to the user based on the identity information of the caller. A subsequent operation is displaying the alternate destinations to the user when the determination to provide the alternate destination options is affirmative. Determining whether user selection of one of the alternate destinations is received within a predetermined time period is another operation. Routing at least one of the phone call and information related to the phone call to the user selected one of the alternate destinations when the user selects to redirect the phone call within the predetermined time period is yet another operation. An alternate operation includes routing at least one of the phone call and information related to the phone call to a predetermined alternate destination when the user fails to select to redirect the phone call within the predetermined time period.

The systems and methods enable selective redirection of an incoming call without answering the call. The systems and methods can be used to determine candidate destinations based on static and/or dynamic information and to presents the candidate destinations for selection, as desired. The systems and methods also enable automatic call redirection to a default candidate destination under specific conditions. The systems and methods can be applied to any situation where a person would like to selectively redirect incoming communication requests without answering. Some example job positions which may use the systems or methods include hotel front desk clerks, service organization contacts, project managers, and so forth.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for redirecting incoming phone calls made to a user, comprising:
   a call server configured to receive phone calls;
   a determination module for determining, upon receipt of an incoming one of the phone calls, whether to provide the user with an option to route the received incoming phone call to an alternate destination;
   a destination selection module for determining which of a plurality of alternate destinations to provide to the user based on identity information for the received incoming phone call and wherein said alternate destinations comprise different users;
   a context module for obtaining and using context information associated with the different users to determine which of the different users is available to take the incoming phone call, based on the different users'schedules, and indicating to the destination selection module which of the different users appear to be available;
   a presentation module for presenting the determined alternate destination or destinations as options to the user when the determination to provide the user with an option to route the received incoming phone call is affirmative;
   a user input module for enabling user selection of one of the alternate destination options; and
   a routing module for routing the received incoming phone call to a selected alternate destination, wherein the determination module uses criteria for determining whether to provide the user with an option to route the received incoming phone call to an alternate destination, said criteria including a member selected from the group comprising: identity information for the received incoming phone call, a status of the user's phone, a time of day, a status of the user's schedule, or a combination thereof.

2. The system of claim 1, wherein the routing module is operable to automatically route the received incoming phone call to a predetermined destination when the user does not act to select the alternate destination option.

3. The system of claim 2, wherein the predetermined destination is the alternate destination.

4. The system of claim 1, wherein the routing module routes information related to the received incoming phone call to be routed with the received incoming phone call, said information including a notification of the received incoming phone call and at least one of identity information of a caller, and information about the user who redirected the received incoming phone call.

5. The system of claim 4, wherein the notification of the received incoming phone call comprises at least one of a text message, email, or instant message.

6. The system of claim 1, further comprising a calendar module for maintaining a schedule of the user and wherein the determination module determines whether to provide the user with an option to route the received incoming phone call to an alternate destination based on the schedule of the user and/or identity information for the received incoming phone call.

7. The system of claim 1, wherein:
the determination module further determines whether to present the alternate destination options to a caller;
the destination selection module further selects and provides the alternate destination as options to the caller when the determination to provide the alternate destination options to the caller is affirmative; and
the routing module routes the received incoming phone call based on a caller selection of the alternate destination option.

8. The system of claim 1, further comprising a feedback module for providing feedback to the caller regarding a status of the received incoming phone call while the alternate destination option is displayed to the user and while the routing module routes the received incoming phone call to the alternate destination.

9. A method for redirecting an incoming phone call made to a user, comprising:
receiving phone calls at a call server;
determining, upon receipt of an incoming one of the phone calls, whether to provide the user with an option to route the received incoming phone call to an alternate destination;
selecting which of a plurality of alternate destinations to be provided to the user based on identity information for the received incoming phone call and wherein said alternate destinations comprise different users;
using context information associated with the different users to determine which of the different users is available to take the incoming phone call, based on the different users' schedules;
indicating which of the different users appear to be available;
providing the alternate destination or destinations as options to the user when the determination to provide the user with an option to route the received incoming phone call is affirmative; and
routing the received incoming phone call to a first alternate destination when the user selects to redirect the received incoming phone call to the first alternate destination, wherein determining whether to provide the user with an option to route the received incoming phone call to an alternate destination uses criteria including a member selected from the group comprising: identity information for the received incoming phone call, a status of the user's phone, a time of day, a status of the user's schedule, or a combination thereof.

10. The method of claim 9, further comprising routing the received incoming phone call to a predetermined destination when the user does not act to select the alternate destination option.

11. The method of claim 9, further comprising:
determining whether to provide alternate destination options to a caller;
selecting the alternate destination options to be provided to the caller based on a predetermined criterion;
displaying the alternate destination as options to the caller when the determination to provide the alternate destination option is affirmative; and
routing the received incoming phone call to a second alternate destination when the caller selects to redirect the received incoming phone call to the second alternate destination.

12. The method of claim 9, further comprising restricting a number of hops the received incoming phone call can make, wherein determining whether to provide the alternate destination option to the user is based on a number of hops the received incoming phone call has made before being routed to the user.

13. The method of claim 9, wherein at least one of determining whether to provide an alternate destination option to the user and selecting the alternate destination to be provided to the user is based on presence data of the user determined as a result of user interaction with electronic devices in communication with the call server.

14. The method of claim 9, further comprising displaying answer, ignore, and forward options to the user in addition to the alternate destination option.

15. The method of claim 9, further comprising receiving the user selection to redirect the received incoming phone call to the alternate destination via a user input device.

16. The method of claim 9, further comprising enabling the user to dynamically select a different alternate destination not displayed by selecting the different alternate destination from a list or by inputting the different alternate destination.

17. An article of manufacture including a non-transitory computer usable storage medium having computer readable program code embodied therein for redirecting an incoming phone call made to a user, comprising computer readable program code capable of performing the operations of:
obtaining, upon receipt of an incoming phone call at a call server, identity information of a caller for the received incoming phone call;
determining, upon receipt of an incoming one of the phone calls, whether to provide alternate destinations as options to the user, the alternate destinations comprising a plurality of different users;
selecting the alternate destinations to be provided to the user based on the identity information of the caller;
using context information associated with the different users to determine which of the different users is available to take the incoming phone call, based on the different users' schedules;
indicating to the destination selection module which of the different users appear to be available;
displaying the alternate destinations to the user when the determination to provide the alternate destination options is affirmative;
determining whether user selection of one of the alternate destinations is received within a predetermined time period;
routing the received incoming phone call and information related to the received incoming phone call to the user selected one of the alternate destinations when the user selects to redirect the received incoming phone call within the predetermined time period; and
routing at least one of the received incoming phone call and information related to the phone call to a predetermined alternate destination when the user fails to select to redirect the received incoming phone call within the predetermined time period, wherein determining whether to provide alternate destinations as options to the user uses criteria including a member selected from the group comprising: identity information for the received incoming phone call, a status of the user's phone, a time of day, a status of the user's schedule, or a combination thereof.

* * * * *